July 24, 1934.  F. W. CUTLER  1,967,397
CONVEYER SYSTEM
Filed Oct. 30, 1931   2 Sheets-Sheet 1
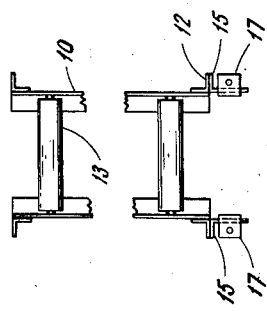
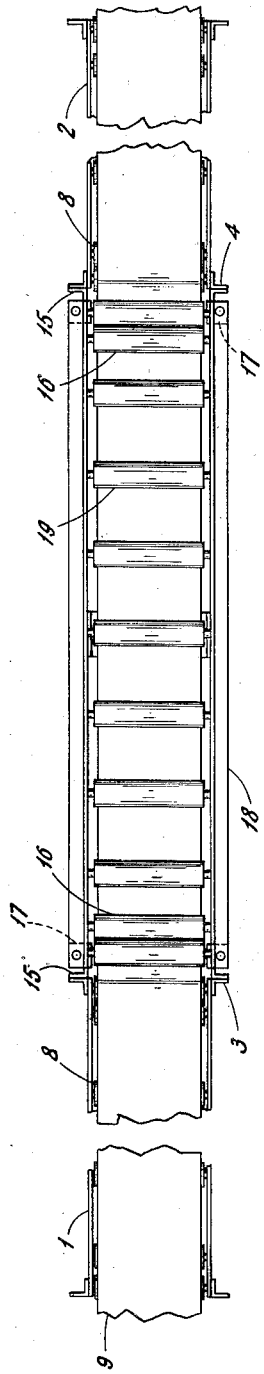
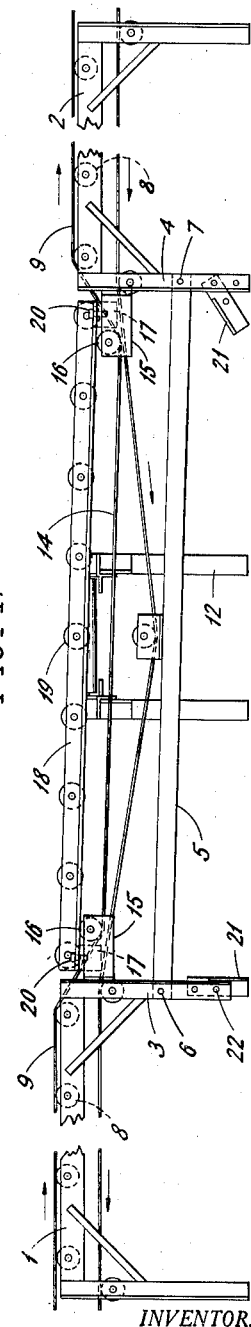
FIG. 1.
FIG. 2.
INVENTOR.
Frank. W. Cutler.
BY Philip A. Minnis
ATTORNEY July 24, 1934.  F. W. CUTLER  1,967,397
CONVEYER SYSTEM
Filed Oct. 30, 1931    2 Sheets-Sheet 2
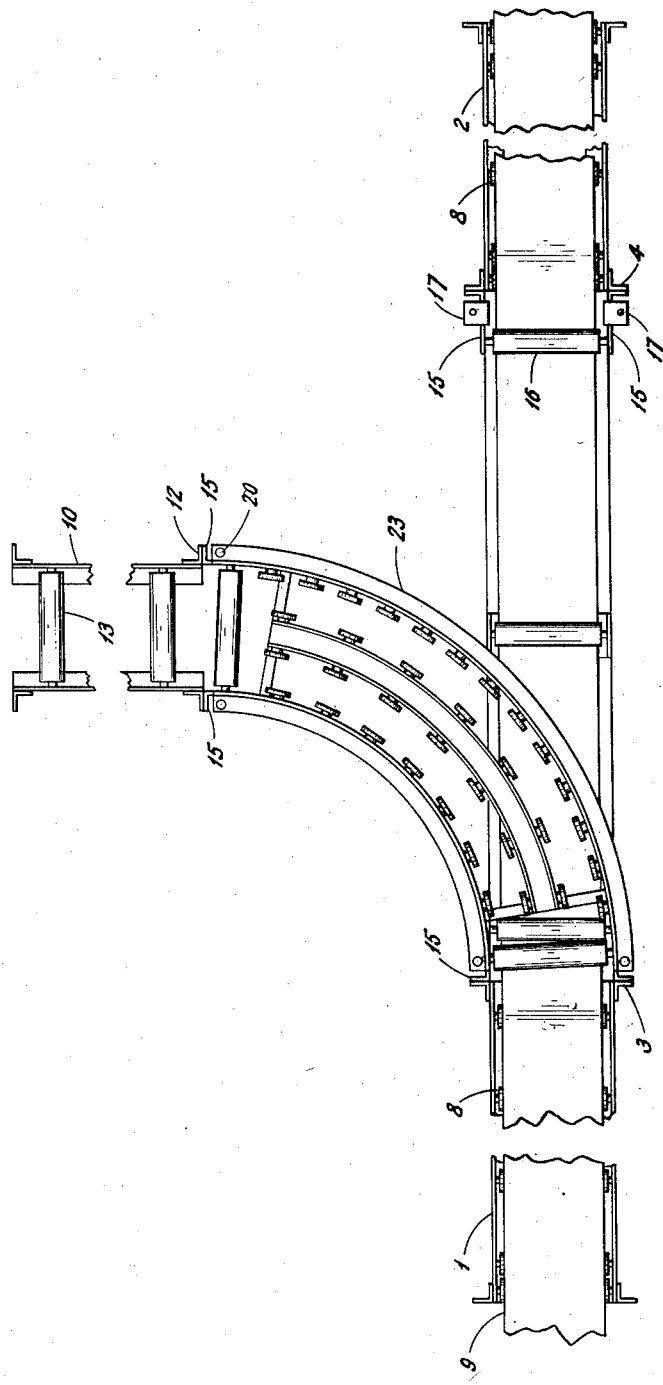
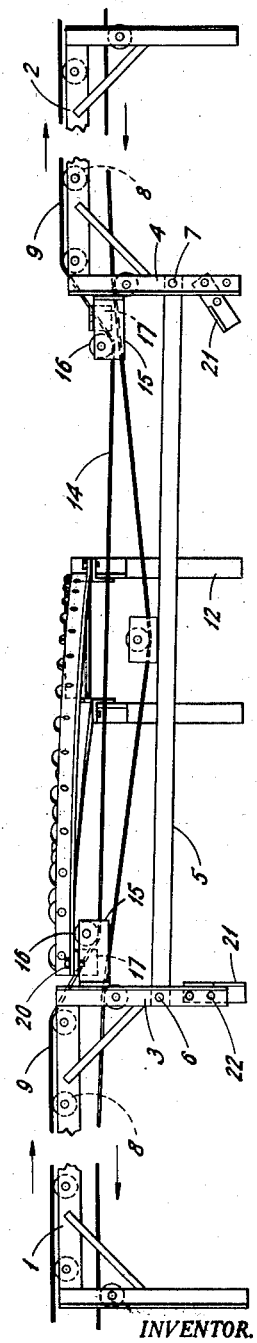
INVENTOR.
Frank. W. Cutler.
BY Philip P. Minnis
ATTORNEY Patented July 24, 1934

1,967,397

UNITED STATES PATENT OFFICE 1,967,397

CONVEYER SYSTEM

Frank W. Cutler, Portland, Oreg., assignor to Food Machinery Corporation, San Jose, Calif., a corporation of Delaware Application October 30, 1931, Serial No. 571,980

17 Claims. (Cl. 198—20)

This invention relates to certain improvements in conveying systems such as may suitably be used in packing houses for conveying filled boxes of fruit, or the like, from place to place and is particularly concerned with the construction of a conveying system embodying a main or trunk line conveyor and one or more branch line conveyers to which articles being conveyed may be diverted from the trunk line.

In conveying systems of this character, it is often desirable to make use of an endless belt or the like for the main conveyer in which case, however, a great deal of difficulty is met with in trying to divert articles from the belt to the branch line, particularly if the articles are very large or heavy, such as filled boxes of fruit. It will be appreciated that in many cases it is extremely difficult, if not altogether impossible, to slide the boxes off the belt conveyer on to the branch line conveyer on account of the large amount of frictional resistance between the belt and the box resting thereon.

It is one of the principal objects of this invention to construct a conveying system having an endless trunk line conveyer from which articles may readily be diverted to branch lines when desired.

It is also an object to provide an endless conveyer with one or more intermediate non-conveying portions depressed below the conveying planes of the conveying portions, whereby an independent conveyer section may be inserted either to bridge the non-conveying portion or to connect a conveying portion with a branch line conveyer.

Another object is to provide an endless conveyer with an intermediate portion of removable independent gravity conveyer and means associated with the frame of the endless conveyer adapted to reverse the inclination of the gravity conveyer section at will, whereby articles may be conveyed thereover in either direction.

With such object in view, as well as others which will hereinafter become apparent, the invention resides in the novel construction arrangement and combination of parts hereinafter described and illustrated in the accompanying drawings, it being understood that numerous modifications and variations may be resorted to without departing from the spirit of the invention and I deem myself entitled to all such modifications and variations as fall within the scope of the claims appended hereto.

In the drawings wherein like reference characters denote like parts throughout the several views:

Fig. 1 is a plan view of a portion of a conveying apparatus embodying the principles of my invention and illustrating the arrangement of parts when articles are to be conveyed over the trunk line conveyer without diversion.

Fig. 2 is a side elevation of the apparatus shown in Fig. 1.

Fig. 3 is a plan view of the apparatus illustrating the arrangement of parts when articles are to be diverted from the trunk line conveyer to a branch line.

Fig. 4 is a side elevation of the apparatus shown in Fig. 3.

The main or trunk line conveyer comprises the frames 1 and 2 supported by legs 3 and 4 respectively and interconnected by the stringer members 5, pivoted to the supporting legs at 6 and 7. A plurality of transversely arranged rollers 8 are rotatably mounted in the frames and an endless conveyer belt 9 is supported by the rollers and may be driven from any suitable source of power. In the particular disposition of parts illustrated in the drawings, the belt 9 is driven in the direction indicated by the arrows, but as will later be seen, the construction is such that the belt may be operated in either direction according to requirements.

A branch line conveyer is disposed to one side of the main line and may be of any ordinary type, either gravity or power operated. In the construction shown, it is of the gravity type and comprises a frame 10 supported by legs 12 and carrying a plurality of conveyer rollers 13 rotatably journaled in the frame.

Intermediate the length of the conveyer belt 9 and at a point adjacent the branch line, means is provided for depressing the belt so as to form a non-conveying portion 14 between the adjacent conveying portions. Such means comprises two pairs of spaced brackets 15 secured to the adjacent frame supporting legs 3 and 4 and carrying the rotatable rollers 16 beneath which the belt 9 is passed. Although only one depressed portion is shown, it will be understood that others may be provided throughout the length of the main conveyer according to the number of branch line conveyers, one being provided adjacent the end of each branch conveyer as shown.

The brackets 15 are provided with auxiliary brackets 17 which form the support for an independent rectilinear section of gravity conveyer comprising side frame members 18 and conveyer rollers 19, which section bridges over the depressed portion of the conveyer belt so as to form a continuous conveyer. The gravity conveyer section may be removably secured in place by pins 20 extending downwardly from the side members 18 through the auxiliary brackets 17.

In order that articles delivered from one conveying portion of the belt conveyer to the interposed section of gravity conveyer may pass by gravity to the other conveying portion of the belt, the adjacent legs 3 and 4 are provided with hinged extensions 21 which may be swung into position to elevate either end of the gravity section. Pins 22 may be inserted through cooperating holes in the legs 3 and 4 and the hinges 21 to fasten the hinged extensions in operative position. By this construction it will be apparent that the gravity conveyer section may be inclined in either direction according to the direction in which it is desired to operate the endless belt 9.

The apparatus so far described provides a continuous conveyer over which articles may be conveyed from one end to the other without diversion therefrom. When it is desired to divert the articles from the belt conveyer to the branch line conveyer, the rectilinear section of gravity conveyer is removed from its supports and a curved section 23 is substituted. The curved section is similar in construction to the rectilinear section except that in the drawings it has been shown as provided with rotatable conveying wheels instead of rollers which is a preferred construction for curved sections and this curved section rests at one end upon either pair of auxiliary brackets 17 and at its other end on a similar pair of brackets provided on the branch conveyer. When this curved section is in position it forms a continuation of that conveying portion of the endless belt 9 with which it abuts and connects it with the branch line conveyer so that conveyed articles are diverted from the main conveyer to the branch conveyer.

It is believed that the construction and operation of the apparatus is sufficiently clear without further discussion and what I deem as new and desire to protect by Letters Patent is:

1. In a conveying apparatus, an endless conveying means having a non-conveying portion and a conveying portion on each side thereof, said non-conveying portion being permanently depressed below the conveying planes of the conveying portions, a support adjacent that end of one of said conveying portions adjacent the depressed portion, and a separate independent conveyer section adapted to cooperate with the adjacent conveying portion to form a continuation thereof, said independent conveyer section being removably supported above the depressed portion by said support to permit ready removal for replacement by a substitute section.

2. In a conveying apparatus, an endless conveying means having a non-conveying portion and a conveying portion on each side thereof, said non-conveying portion being depressed below the conveying planes of the conveying portions, supporting means adjacent that end of each conveying portion next to the depressed portion and a separate independent curved conveyer section either end of which is engageable with either of said supporting means whereby to form a continuation of either conveying portion, the ends of said independent conveyer section being removably attachable to said supporting means whereby to permit ready removal for replacement by substitute sections.

3. In a conveying apparatus, an endless conveying means having a non-conveying portion and a conveying portion on each side thereof, said non-conveying portion being depressed below the conveying planes of the conveying portions, supporting means adjacent each of those ends of the conveying portions next to the non-conveying portion, and a separate independent conveyer section engageable with said supports and adapted to bridge the depressed portion and cooperate with said conveying portions to form a continuous conveyer, said independent conveyer being removably attachable to said supporting means whereby to permit ready removal for replacement by substitution.

4. In a conveying apparatus, an endless conveyer, means for depressing an intermediate portion of said conveyer whereby to form a non-conveying portion between adjacent conveying portions, a separate independent gravity conveyer unit arranged above the depressed portion and in abutting relation with that end of a conveying portion adjacent the depressed portion whereby to form a continuation of said conveying portion, said independent gravity conveyer unit being readily removable to permit interchangeability with substitute units and means for varying the relative elevations of the ends of said conveying portions adjacent the depressed portion.

5. In a conveying apparatus, an endless conveying means having a depressed non-conveying portion, a separate and independent gravity conveying section disposed above said depressed portion and adapted to bridge the same whereby to form a continuous conveyer, said independent gravity conveyer section being readily removable for replacement by substitute sections, and means for varying the relative elevations of the conveying portions of said endless conveying means adjacent the depressed portion.

6. In a conveying apparatus, an endless conveying means, a frame for supporting the same, supports for said frame, means associated with the frame for depressing an intermediate portion of said conveying means whereby to form a non-conveying portion between adjacent conveying portions, a separate and independent gravity conveyer section, means for supporting said gravity conveyer section in abutting relationship with that end of a conveying portion adjacent the depressed portion whereby to form a continuation of said abutting conveying portion, said independent gravity conveyer section being readily detachable from said support to permit substitution of a substitute section and adjustable extensions on said frame supports adapted to vary the elevations of those conveying portions of said first named conveying means adjacent the depressed portion.

7. In a conveying system, an endless main conveyer having a non-conveying portion and a conveying portion on each side thereof, means for permanently depressing the non-conveying portion below the conveying planes of the conveying portions to provide for the insertion of conveying means for bridging the depressed portion, a branch conveyer extending angularly away from the main conveyer and having its receiving end spaced apart therefrom, a separate portable conveyer unit arranged above the depressed portion of the main conveyer and interconnecting the receiving end of the branch conveyer with that end of a conveying portion of the main conveyer adjacent the depressed portion whereby articles passing along the main conveyer are diverted to the branch conveyer, said separate conveyer unit being readily removable to permit replacement by a substitute conveyer unit for bridging the depressed portion of the main conveyer to direct articles thereover without diversion.

8. In a conveying system, an endless main conveyer having conveying and non-conveying portions, means for depressing the non-conveying portions below the conveying planes of the conveying portions, a plurality of branch conveyers extending angularly away from the main conveyer and each having its receiving end adjacent a depressed portion of the main conveyer and spaced apart therefrom, a separate readily removable curved conveyer unit interconnecting an end of a conveying portion of the main conveyer adjacent a depressed portion with an adjacent branch conveyer to which articles are to be directed from the main conveyer, and a separate, readily removable rectilinear conveyer unit disposed above another depressed portion of the main conveyer to bridge said portion adjacent a branch conveyer by which articles are to be passed.

9. In a conveying system, an endless main conveyer having a plurality of conveying and non-conveying portions, means for depressing the non-conveying portions below the conveying planes of the conveying portions, a plurality of branch conveyers extending angularly away from the main conveyer and each having its receiving end adjacent a depressed portion of the main conveyer and spaced apart therefrom, and separate readily removable curved and rectilinear conveyer units selectively insertable above any of the depressed portions of the main conveyer, the curved conveyer units being adapted to connect ends of the conveying portions of the main conveyer adjacent the depressed portions with the receiving ends of adjacent branch conveyers to direct articles from the main to the branch conveyers, and the rectilinear conveyer units being adapted to bridge the depressed portions of the main conveyer whereby to direct articles thereover past the adjacent branch conveyers.

10. In a conveying apparatus, an endless conveyer, means for depressing an intermediate portion of said conveyer whereby to form a non-conveying portion between adjacent conveying portions, a separate portable gravity conveyer unit arranged above the depressed portion of said endless conveyer and in abutting relation with that end of a conveying portion adjacent the depressed portion whereby to form a continuation of said conveying portion, means for removably supporting said gravity conveyer in position to permit interchangeability with substitute sections, and means for varying the relative elevations of the ends of the conveying portions of the endless conveyer adjacent the depressed portion.

11. In a conveying apparatus, an endless conveying means having a depressed non-conveying portion, a separate portable gravity conveyer section disposed above said depressed portion and adapted to bridge the same to form a continuous conveyer, means for removably supporting said gravity conveyer section in position to permit interchangeability with substitute sections, and means for varying the relative elevations of the conveying portions of the endless conveying means adjacent the depressed portion.

12. In a conveying apparatus, an endless conveyer, means for maintaining an intermediate portion of said conveyer depressed below adjacent portions whereby to form a non-conveying portion between adjacent conveying portions, a separate rectilinear conveying unit for bridging said depressed portion to form a continuous rectilinear conveyer, a separate curved conveyer unit cooperable with an end of said endless conveyer adjacent the depressed portion thereof to form a curvilinear continuation of said endless conveyer, and means for interchangeably connecting either of said separate conveyer units with the endless conveyer above its depressed portion whereby to form either a rectilinear or curvilinear continuation thereof.

13. In a conveying apparatus, an endless conveying means, means for depressing an intermediate portion of said conveying means whereby to form a non-conveying portion between adjacent conveying portions, and a separate removable conveyer unit arranged above the depressed portion in abutting relation with an end of the conveying portion adjacent the depressed portion whereby to form a continuation of said conveying portion, said independent conveyer unit being detachably secured to said apparatus to permit ready removal and replacement by a substitute unit.

14. In a conveying apparatus, an endless conveyer, means for depressing an intermediate portion of said conveyer to form a non-conveying portion between adjacent conveying portions, a separate removable conveyer section disposable in operative position above the depressed portion of said endless conveyer and in abutting relation with an end of a conveying portion thereof adjacent the depressed portion to form a continuation of said conveying portion, and means for detachably securing said removable conveyer section in operative position above the depressed portion of the endless conveyer whereby said section may be readily removed for replacement by a substitute conveyer section.

15. In a conveying apparatus, an endless conveyer having conveying portions and an intermediate non-conveying portion depressed below the conveying planes of said conveying portions, a separate removable conveyer section disposable in operative position above the depressed portion of said endless conveyer to bridge the same to form a continuation of said conveying portions, and means detachably securing said removable conveyer section in operative position above the depressed portion of the endless conveyer whereby said section may be readily removed for replacement by a substitute section.

16. In a conveying apparatus, an endless conveyer, means for depressing an intermediate portion of said conveyer to form a non-conveying portion between adjacent conveying portions, a plurality of separate interchangeable conveyer sections selectively insertable above said depressed portion and cooperable with a conveying portion of said endless conveyer to form a continuation thereof, and means for detachably securing either of said separate conveyer sections in operative position above the depressed portion of the endless conveyer whereby said section may be readily removed for interchange.

17. In a conveying apparatus, an endless conveyer, means for depressing an intermediate portion of said conveyer to form a non-conveying portion between adjacent conveying portions, and separate readily removable curved and rectilinear conveyer units selectively insertable above said depressed portion of the endless conveyer, the curved conveyer unit being cooperable with an end of a conveying portion of said endless conveyer adjacent the depressed portion to form a continuation of said conveying portion, and the rectilinear conveyer unit being adapted to bridge the depressed portion of the endless conveyer whereby conveyed articles may pass across the depressed portion of the endless conveyer from one conveying portion thereof to the other.

FRANK W. CUTLER.